Nov. 27, 1951 G. A. LYON 2,576,130
WHEEL COVER
Filed Jan. 20, 1947
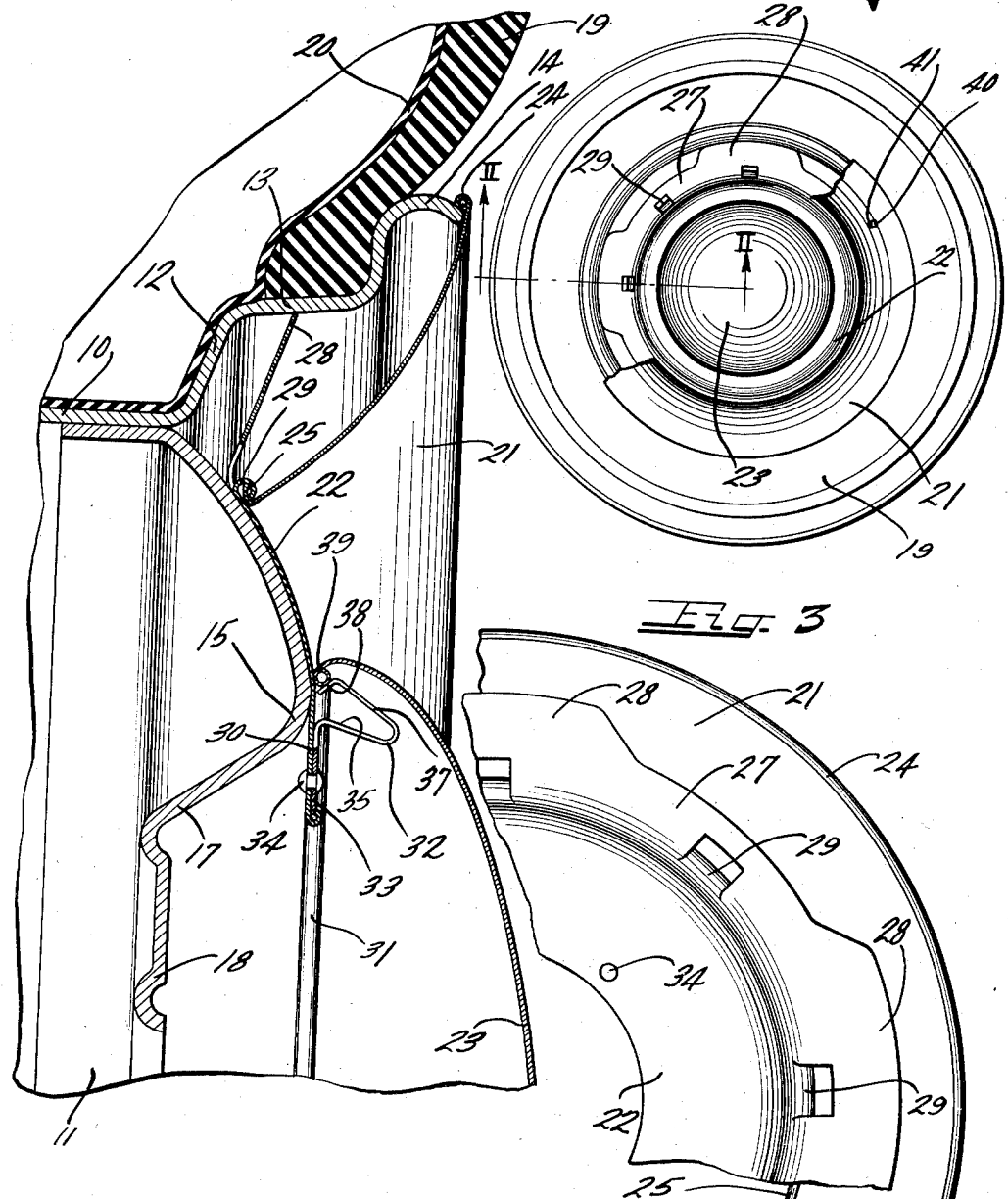
Inventor
GEORGE ALBERT LYON Patented Nov. 27, 1951

2,576,130

UNITED STATES PATENT OFFICE 2,576,130

WHEEL COVER

George Albert Lyon, Detroit, Mich.

Application January 20, 1947, Serial No. 723,173

9 Claims. (Cl. 301—37)

This invention relates to improvements in wheel structures, and more particularly wheel structures of the kind used on vehicles and having pneumatic tires, and to a novel cover assembly for the outer side of the wheel.

An important object of the present invention is to provide an improved cover assembly for a wheel including a multi-flanged tire rim and load-sustaining body part.

Another object of the invention is to provide an improved composite wheel cover wherein a retaining member secures a plurality of cover components into a unitary assembly and also serves as a medium by which the cover is secured in place on a wheel.

A further object of the invention is to provide a cover assembly including a retaining member and a cover member, and novel means for securing the retaining member and cover member together.

A still further object of the invention is to provide a novel cover assembly for application to an existing wheel.

Yet another object of the invention is to provide a cover assembly for completely covering the outer side of vehicle and which is adapted to be applied to the wheel without regard to any special structural alteration in the wheel and which is readily adaptable to various structural features or arrangements on the wheel.

According to the general features of the invention, there is provided a cover for a vehicle wheel of the kind having a multi-flanged tire rim and a load-sustaining body part, a retaining plate member formed for wedging biting engagement with the tire rim and having a portion thereof adapted to conceal the body portion of the wheel about the central bolt-on portion of the wheel, a trim ring member for concealing the tire rim and the radially outer margin of the retaining plate and engaging the retaining plate on an annular line adjacent to the radially outer margin of the retaining plate, the retaining plate having a plurality of retaining fingers securing the radially inner margin of the trim ring thereto, and a hub cap cover member separably secured to the radially inner marginal portion of the retaining plate.

According to other general features of the invention, the radially inner margin of the retaining plate extends in a substantially flat plane and carries a plurality of hub-cap retaining members with which the hub cap is in snap-on pry-off retaining engagement.

According to further general features of the invention, the retaining plate is formed complementary to an axially outwardly extending annular reinforcing nose bulge of the vehicle wheel body to which it is applied, and has the radially inner margin thereof extending in a flat plane to project radially inwardly beyond the peak of the wheel nose bulge, the radially inwardly extending margin of the retaining plate having a series of hub cap retaining clips secured thereto.

Other objects, features and advantages of the present invention will be readily apparent from the following detailed description of a preferred embodiment thereof, taken in conjunction with the accompanying drawings, in which:

Figure 1 is a side elevational view of a wheel structure embodying the features of the present invention, with certain parts of the cover broken away to reveal details of structure therebehind;

Figure 2 is an enlarged radial sectional view taken substantially on the line II—II of Figure 1; and Figure 3 is a fragmentary rear elevational view of the cover assembly.

As shown on the drawings:

A wheel with which the present invention is adapted to be used comprises a tire rim 10 and a wheel body 11 which is concentrically disposed with respect to the tire rim and secured to the base flange thereof in any suitable fashion.

The tire rim is formed in the usual drop-center, flanged fashion, including at its outer side a side flange 12 extending generally radially outwardly and slightly axially outwardly, an intermediate generally axially outwardly extending flange 13, and a terminal flange 14.

The wheel body 11 is preferably of the type which is adapted to be formed from heavy sheet metal as a stamping and has a generally axially outwardly extending annular reinforcing nose bulge 15 which defines a central dished portion 17, including a bolt-on flange 18 adapted to be secured to a portion of a vehicle axle (not shown).

A conventional tire 19 is adapted to be supported in the tire rim and has an inflatable tube 20 therein.

Since the outer side of the vehicle wheel, due to the flanged and functionally contoured structure thereof, presents a notoriously unattractive appearance and due to the various corners and crevices presented, is especially susceptible to collecting road dirt, which further detracts the appearance of the wheel and has a deteriorating effect, it is desirable and expedient to cover the outer side of the wheel with an ornamental, protective covering.

According to the present invention an improved cover assembly is provided which is readily and self-adjustably adapted to be mounted on the functional wheel without alteration of any of the functional or conventional characteristics of the wheel. To this end, a trim ring cover member 21 is supported in mounted relation to the wheel by a retaining ring member or plate 22, and a hub cap cover member 23 is also adapted to be supported in mounted relation to the wheel by the retaining plate 22. All of these members are adapted to be made from suitable sheet material.

The trim ring cover member 21 is preferably of a magnitude and extent to be disposed in ornamental, protective relation to the outer side of the tire rim 10 and is preferably formed with a cross sectional contour generally simulating the side wall curvature of the tire 19. As a result, where the outer side of the trim ring member 21 is of a light or white color, it resembles a radially inner white side wall extension of the tire.

At its outer margin, the trim ring cover member 21 is preferably formed with a reinforcing structure such as a bead 24 which is adapted to circumscribe the tire rim terminal flange 14. From the bead 24, the trim ring member 21 extends on a convex contour generally radially inwardly and axially inwardly to a marginal reinforcing flange 25 which is preferably annularly formed to extend generally hook-shape radially outwardly behind the trim ring inner margin. The shoulder provided at the juncture of the flange 25 with the body of the trim ring member 21 is adapted to fit snugly against the opposing surface at the retaining plate member 22.

The retaining plate member 22 is preferably formed with means for biting wedging engagement with the outer intermediate flange 13 of the tire rim. For this purpose, the retaining plate member 22 is formed in the body portion thereof with a contour substantially complementary to that of the radially outer side of the nose portion 15 of the body member so as to lie snugly thereagainst in assembly. The radially outer margin of the retaining member is formed as a generally radially outwardly and slightly axially outwardly extending reinforcing flange 27 of a general diameter somewhat less than the diameter described by the inner face of the intermediate flange 13. Extending generally radially outwardly in the plane of the flange 27 is a plurality of equally spaced wedging, biting retaining fingers 28, herein shown as four in number. These fingers 28 are of an outer edge diameter to enter into wedging biting engagement with the inner surface of the intermediate tire rim flange 13 when the cover is pushed axially inwardly into mounted position on the wheel.

Preferably struck out from the juncture area of the outer marginal flange 27 of the retaining member 22 are a plurality of integral interlocking fingers 29 which are curled axially outwardly and radially inwardly into locking relation to the hook-like inner marginal reinforcing flange 25 of the trim ring cover member. In this manner the trim ring cover member 21 and the retaining plate 22 are permanently secured together. As shown, there may be a substantial number of the securing fingers 25 formed at spaced intervals on an annular line conforming to the marginal flange 25 of the trim ring cover member and sufficiently closely disposed to retain the trim ring cover member quite thoroughly.

At its inner margin the retaining plate member 22 is preferably formed with a flat flange 30 which extends radially inwardly beyond the peak of the wheel body nose 15 whereby the marginal flange 30 clears any structure that may be adjacent to the radially outer side of the dished depression portion 17 of the wheel body. By preference, a reinforcing bead 31 is formed at the radially inner extremity of the flange 30.

For securing the hub cap cover member 23 removably in place on the retaining member 22, the radially inner marginal flange 30 is equipped with a plurality of retaining spring clips 32. Each of the clips 32 is formed with a base flange portion 33 which is secured to the retaining member flange 30 as by means of rivet 34. Only a single rivet 34 is needed because the extremity of the flange 33 is disposed contiguous the bead 31 which thereby holds the clip against swiveling about the axis of the rivet 34. From the radially outer end of the base flange 33 extends a generally axially outwardly and slightly radially inwardly tilted goose-neck flange 35 which merges at its outer end on a radius with a cam flange 37 at the axially inner end of which is a generally axially inwardly and radially inwardly extending retaining shoulder flange terminal 38.

The retaining clips 32 are disposed in a circular, equidistantly spaced series with the shoulder flanges 38 arranged to engage a marginal reinforcing bead 39 on the hub cap cover member 23 and press the bead against the adjacent surface of the retaining plate 22. By preference, the diameter of the hub cap cover member 23 is such that the bead 39 engages the retaining plate 22 opposite substantially the peak of the nose portion 15 of the wheel body. Thereby, inward pressure applied against the retaining plate 22 by the edge of the hub cap cover member 23 in the application thereof during assembly is solidly resisted or backed up by the nose portion of the wheel body.

For removing the hub cap cover 23 a pry-off tool applied between the bead 35 and the retaining member 22 and appropriate manipulation of the pry-off tool will snap the bead 39 out of engagement with the retaining clip 32. By having the under portion behind the retaining plate 22 which is engaged by the pry-off tool solidly backed up by the wheel nose 15 will save the retaining plates from pry-off tool damage.

The trim ring cover member 21 may be formed with an aperture 40 for protrusion therethrough of a valve stem 41.

When the cover is applied to the wheel the valve stem aperture 40 is first registered with the end portion of the valve stem 41 and the cover is then finally mounted by pressing the same inwardly until the fingers 28 of the retaining member are in full biting wedging engagement with the tire rim intermediate flange 13 and the main body portion of the retaining member 22 is in engagement with the wheel body 11 and particularly the nose portion 15 thereof.

The present cover affords a complete outer side cover for the wheel and by having the several exposed components of contrasting finish, an attractive ornamental effect is attained. Moreover, since all the exposed surfaces of the cover are smoothly contoured, they are easily kept clean. The wheel is protected by the cover against dirt and the deteriorating effects of road splash.

It will, of course be understood that various details of construction may be varied through a wide range without departing from the principles of this invention and it is, therefore, not the purpose to limit the patent granted hereon otherwise than necessitated by the scope of the appended claims.

I claim as my invention:

1. A wheel cover for a vehicle wheel of the kind having a multi-flanged tire rim and a load-sustaining body part, a retaining plate member formed for wedging biting engagement with the tire rim and having a portion thereof adapted to conceal the body portion of the wheel about the central bolt-on portion of the wheel, a trim ring member for concealing the tire rim and the radially outer margin of the retaining plate and engaging the retaining plate on an annular line adjacent to the radially outer margin of the retaining plate, the retaining plate having a plurality of retaining fingers securing the radially inner margin of the trim ring thereto, and a hub cap cover member separably secured to the radially inner marginal portion of the retaining plate.

2. A wheel cover for a vehicle wheel of the kind having a multi-flanged tire rim and a load-sustaining body part, a retaining plate member formed for wedging biting engagement with the tire rim and having a portion thereof adapted to conceal the body portion of the wheel about the central bolt-on portion of the wheel, a trim ring member for concealing the tire rim and the radially outer margin of the retaining plate and engaging the retaining plate on an annular line adjacent to the radially outer margin of the retaining plate, the retaining plate having a plurality of retaining fingers securing the radially inner margin of the trim ring thereto, and a hub cap cover member separably secured to the radially inner marginal portion of the retaining plate, the radially inner margin of the retaining plate extending in a substantially flat plane and carrying a plurality of hub-cap retaining members with which the hub cap is in snap-on pry-off retaining engagement.

3. A wheel cover for a vehicle wheel of the kind having a multi-flanged tire rim and a load-sustaining body part having an annular reinforcing nose bulge, a retaining plate member formed for wedging biting engagement with the tire rim and having a portion thereof adapted to conceal the body portion of the wheel about the central bolt-on portion of the wheel, a trim ring member for concealing the tire rim and the radially outer margin of the retaining plate and engaging the retaining plate on an annular line adjacent to the radially outer margin of the retaining plate, the retaining plate having a plurality of retaining fingers securing the radially inner margin of the trim ring thereto, and a hub cap cover member separably secured to the radially inner marginal portion of the retaining plate, the retaining plate being formed complementary to the axially outwardly extending annular reinforcing nose bulge of the vehicle wheel body, the radially inner margin of the retaining plate extending in a flat plane to project radially inwardly beyond the peak of the wheel nose bulge, said radially inwardly extending margin having a series of hub cap retaining clips secured thereto.

4. In combination, in a cover assembly for a vehicle wheel, a retaining plate member and a cover member having a margin thereof in engagement with the retaining plate member, the margin of the cover member having an under-turned hook-like flange thereon, the retaining plate member having a hook-like retaining structure thereon concealed behind the cover member and retainingly interlocked with the hook-like flange of the cover member, and means extending in opposite directions from the juncture of the retaining plate member and the cover member and adapted respectively for engagement with the wheel and for engagement by a second cover member.

5. In combination, in a cover assembly for vehicle wheel, a retaining plate member and a cover member having a margin thereof in engagement with the retaining plate member, the margin of the cover member having a hook-like flange thereon, the retaining plate member having a hook-like retaining structure thereon interlocked with the hook-like flange of the cover member, and means extending in opposite directions from the juncture of the retaining plate member and the cover member and adapted respectively for engagement with the wheel and for engagement by a second cover member, said portion of the retaining plate member engageable by the second cover member having a plurality of spring clips secured thereto for retainingly engaging the second cover member and holding it on the retaining plate member.

6. In combination, a cover assembly of the character described, a trim ring cover member of generally tire side wall curvature simulating cross section and adapted to be disposed in concealing relation to a flanged tire rim, the inner margin of the trim ring cover member having an underturned hook-like annular reinforcing flange, a retaining plate adapted to be disposed in engagement with the body of the wheel and having a plurality of generally radially outwardly extending tire rim engaging fingers concealed behind the trim ring cover member, a plurality of struck-out retaining fingers on said retaining plate curled into interlocking engagement with said annular reinforcing flange on the trim ring cover member for permanently securing the trim ring cover member and the retaining plate member together, the retaining plate member extending radially inwardly beyond the juncture therewith of the trim ring member and having a plurality of hub cap cover retaining structures thereon, and a hub cap cover member engaging in separable engagement with said hub cap cover retaining structures.

7. In combination in a cover assembly of the character described for ornamentally and protectively covering the outer side of a vehicle wheel including a tire rim and a wheel body, an outer annular cover member, a circular inner cover member, and a retaining member having means thereon concealed behind said outer cover member and permanently securing the retaining member to the inner margin of said outer cover member, said retaining member supporting the inner cover member in separable relationship, said retaining member having means thereon for engagement with the wheel and having a radially inner margin adapted to extend in spaced relation to the adjacent portion of the wheel body, said inner marginal portion having a set of spring clips mounted thereon behind said inner cover member for separable retaining engagement with the inner cover member.

8. In combination in a cover assembly of the character described, an outer annular cover member, a retaining plate member having means thereon for engagement with the wheel and being secured to the inner margin of the outer cover member, the inner margin of said plate being formed with a generally axially outwardly turned reinforcing bead, and a plurality of hub cap cover retaining spring clips secured to said inner margin and having the ends thereof in engagement with the bead, and a rivet securing each of said clips to said margin, the engagement of the ends of the clips with the bead holding the clips against rotation about the axis of the respective rivets.

9. In combination in a cover assembly of the character described, a trim ring member, a retaining plate member, and a hub cap member, the retaining plate member and the inner margin of the trim ring member having interengaging means for retaining the same in assembly, the retaining plate member having means concealed behind the trim ring member for retaining engagement with a wheel, the radially inner portion of the retaining plate having a series of retaining clips thereon and the hub cap member retainingly engaging said clips and being retained thereby on the retaining plate.

GEORGE ALBERT LYON.

REFERENCES CITED

The following references are of record in the file of this patent:

UNITED STATES PATENTS

| Number | Name | Date |
|---|---|---|
| 2,183,220 | Horn | Dec. 12, 1939 |
| 2,368,230 | Lyon | Jan. 30, 1945 |